United States Patent [19]

Ito et al.

[11] Patent Number: 4,719,671
[45] Date of Patent: Jan. 19, 1988

[54] STRAP CONNECTOR

[75] Inventors: Hitomi Ito, Kanagawa; Toshitsugu Furuya, Hyogo, both of Japan

[73] Assignee: Canon Kabushiki Kaisha, Tokyo, Japan

[21] Appl. No.: 47,610

[22] Filed: May 7, 1987

Related U.S. Application Data

[63] Continuation of Ser. No. 784,839, Oct. 4, 1985.

[30] Foreign Application Priority Data

Nov. 8, 1984 [JP] Japan .......................... 59-169346[U]

[51] Int. Cl.⁴ ............................................. F16G 11/00
[52] U.S. Cl. ............................... 24/115 R; 24/115 M; 24/136 R
[58] Field of Search ............ 24/115 R, 30.5 L, 115 H, 24/115 M, 117, 119, 136 R, 136 K, 136 L, 171, 194, 196, 479, 130

[56] References Cited

U.S. PATENT DOCUMENTS

| | | | |
|---|---|---|---|
| 231,574 | 8/1880 | Heinze | 24/136 R |
| 307,806 | 11/1884 | Sailer | 24/115 R X |
| 755,274 | 3/1904 | Clark | 24/136 R |
| 1,393,107 | 10/1921 | Fuller | 24/136 R |
| 4,156,574 | 5/1979 | Boden | 24/115 M X |
| 4,379,358 | 4/1983 | Wibrow | 24/115 M X |
| 4,461,059 | 7/1984 | Bury | 24/115 R X |

FOREIGN PATENT DOCUMENTS 952 of 1889 United Kingdom ............. 24/136 R

Primary Examiner—Kenneth J. Dorner
Assistant Examiner—Laurie K. Cranmer
Attorney, Agent, or Firm—Toren, McGeady & Associates

[57] ABSTRACT

A strap connector comprises a connector body and a core. The connector body is formed in a hollow, approximately square pole like shape with openings formed in two opposed sides thereof. The core is provided with a groove part which is of a width approximately equal to the sum of diameters of two pieces of strap and a base part which has an end face a little wider than the width of the groove part and is located away from and facing the opening of the groove part at a distance about equal to the diameter of the strap.

6 Claims, 12 Drawing Figures

FIG.1
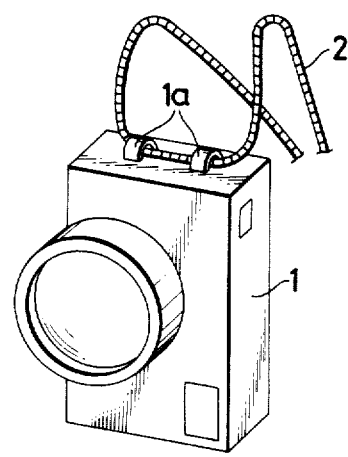
PRIOR ART FIG.2
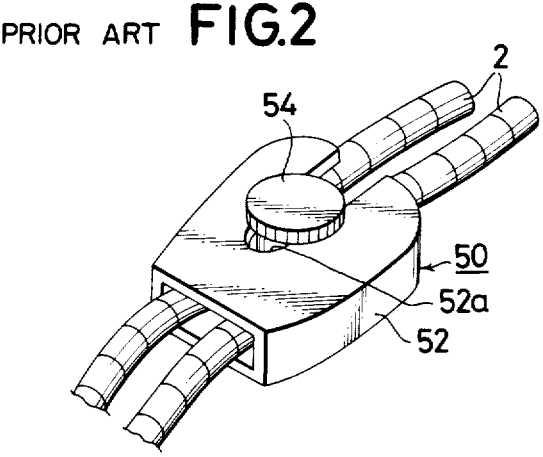

STRAP CONNECTOR

This is a continuation of application Ser. No. 784,839, filed OCT. 4, 1985.

BACKGROUND OF THE INVENTION

1. Field of the Invention

This invention relates to a strap connector for joining together the ends of a strap which is attached to a camera or the like.

2. Description of the Prior Art

For joining together the ends of a strap attached to a camera or the like, varied methods have been known such as hot welding, caulking, etc. However, in the case of a camera arranged to have a strap 2 passed through eyelets 1a as shown in FIG. 1 of the accompanying drawings, the conventional methods necessitate an additional process of joining the ends of the strap 2 together by hot welding or the like after the strap 2 is attached to a camera body on the manufacturing process line of a factory. This means not only the addition of the strap joining process to the camera assembly line but also handling of the camera with the strap 2 attached thereto and thus presents a problem in terms of workability.

To solve the above-stated problem, there has been proposed a strap connector 50 which is arranged as shown in FIG. 2. This connector 50 of the prior art comprises a connector body 52 which has openings arranged to have the strap 2 inserted therethrough; and a core 54 which is arranged to be slidable along a slit 52a of the connector body 52. The ends of the strap 2 are substantially joined together by sliding the core 54 to push the strap 2 against the inner face of the connector body 52 and thus to have the strap pinched in between the core 54 and the inner face of the connector body 52. This proposed improvement permits the strap 2 to be attached to the camera body 1 after completion of the assembly work thereon, so that the problem in terms of the manufacturing process can be solved. In addition to that advantage, this method permits adjustment of the joined ends of the strap 2 to a desired length. However, the strap connector 50 of FIG. 2 has presented another problem which resides in that the core 54 tends to loosen the strap connector by sliding when even a minor impact is inflicted thereon.

SUMMARY OF THE INVENTION

It is an object of this invention to provide a strap connector which solves the problems of the above-stated prior art and is capable of keeping a firm hold on the joint of a strap under an ordinary degree of impact.

To attain the above-stated object, in the strap connector which is arranged according to this invention and comprises a connector body and a core, the connector body is formed in a hollow, approximately square pole-like shape; openings are formed in the two opposed sides of the connector body; the core is provided with a groove part which is of a width about equal to the sum of diameters of two pieces of the strap and a base part which has an end face a little wider than the width of the groove part and is located away from and facing the opening of the groove part at a distance about equal to the diameter of the strap.

The above and further objects and features of this invention will become apparent from the following detailed description of preferred embodiment thereof taken in connection with the accompanying drawings.

BRIEF DESCRIPTION OF THE DRAWINGS

FIG. 1 is an oblique view showing a strap attached to a camera.

FIG. 2 is an oblique view showing a conventional strap connector.

FIG. 3 is an oblique view showing the connector as in a state of joining together the ends of the strap of a camera.

FIG. 4 is an enlarged oblique view showing the details of the strap connector as in a state before the ends of the strap of FIG. 3 are joined together.

FIG. 5 is a transverse sectional view of the strap connector showing it as in the same state as shown in FIG. 4.

FIG. 6 is an enlarged oblique view showing the same strap connector as in a state after joining the ends of the strap.

FIG. 7 is a transverse sectional view of FIG. 6.

DETAILED DESCRIPTION OF THE PREFERRED EMBODIMENTS

Figure 3:
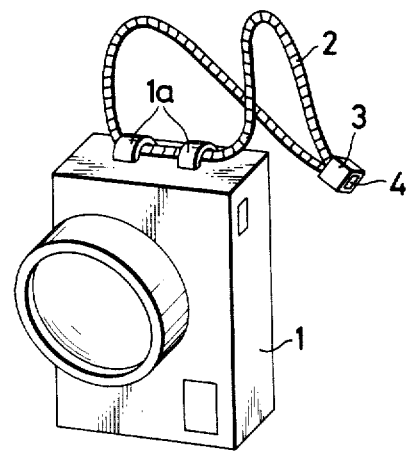
FIGS. 3 to 7 show a strap connector arranged according to this invention as a first embodiment thereof.

A first embodiment of this invention is arranged as shown in FIGS. 3 to 7. The strap connector according to the invention comprises a connector body 3 and a core 4. The connector body 3 is formed in a hollow, approximately square pole-like shape. Openings 3a and 3b are formed in two opposed sides of the body 3. The core 4 is provided with a groove 4a which is of a width about equal to or a little narrower than a width two times as long as the diameter of a strap 2. The core is further provided with a lid portion 4c and a base part 4b which is wider than the width of the groove 4a and is extending toward the opening of the groove part 4a. The base part 4b has its two sides formed into a comb-like shape. The width h2 of the base part 4b is either equal to or a little wider than a width obtained by subtracting the double diameter value h3 of the strap 2 from the inside width h1 of the connector body 3. Further, the groove 4a of the core 4 coincides with the opening 3a of the connector body 3. A distance between the groove part 4a and the base part 4b of the core 4 is arranged to be approximately equal to the diameter of the strap 2.

FIG. 3 shows the strap 2 as in a state of having been passed through eyelets 1a and having the two ends thereof joined together after that by the strap connector arranged according to this invention. FIGS. 4 to 7 show the manner in which the strap 2 is joined by the strap connector.

Figure 4:
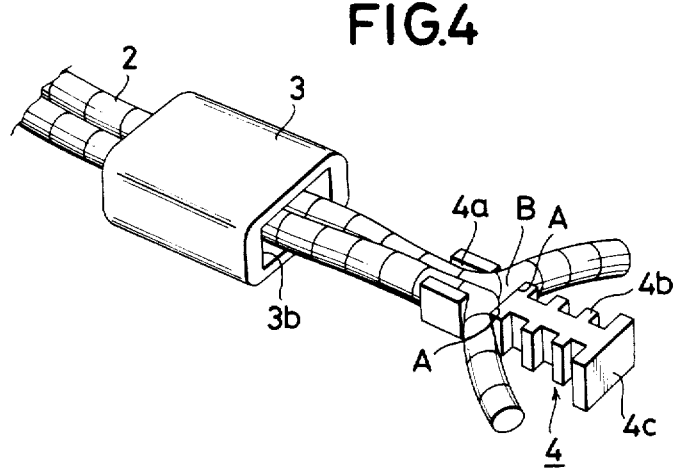
Figure 5:
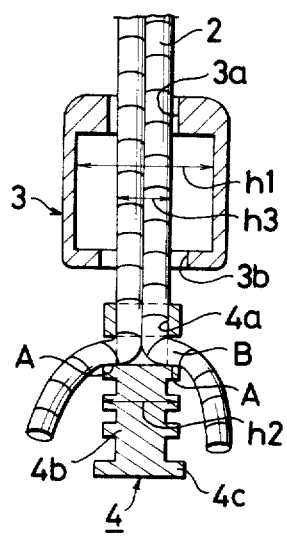
Figure 6:
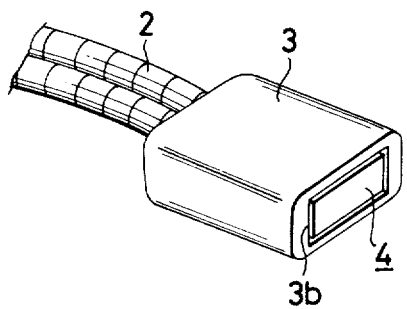
Figure 7:
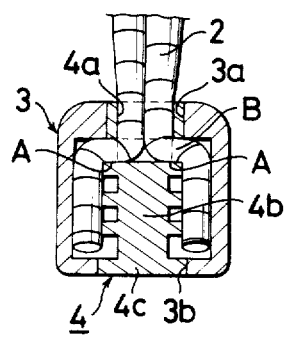

The strap 2 is inserted first into the connector body 3 through the opening 3a thereof and is then pulled out via another opening 3b. After that, the end portions of the strap 2 are fitted into the groove part 4a of the core 4 as shown in FIGS. 4 and 5. With the strap 2 in this condition, when the core 4 is pushed into the connector body 3, the ends of the strap 2 are joined together by means of the connector body 3 and the core 4 as shown in FIGS. 6 and 7. With the core inserted into the connector body, each end of the strap 2 is pinched in between the inner face of the connector body 3 and the base part 4b of the core 4. In addition to that, a part B of the strap 2 is almost rectangularly bent due to a difference between the width of the groove 4a and that of the base part 4b. Then the part B of the strap 2 has the edge part A of the base part 4b bite into it and thus receives an extremely strong pinching force. Further, since both sides of the base part 4b of the core 4 are formed into a comb-like shape, the strap 2 is also brought into contact with a plurality of edges of the core 4 to have also a strong pinching force at these parts.

Figure 8:
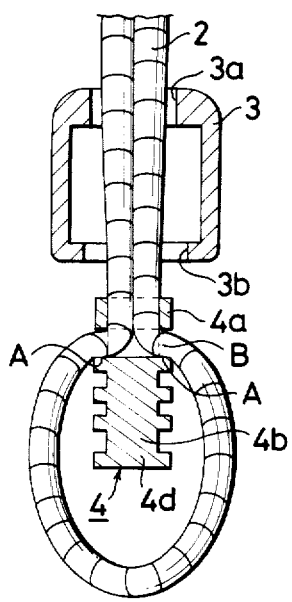
FIGS. 8 and 9 show a strap connector embodying this invention as a second embodiment thereof, FIG. 8 showing it in an enlarged transverse sectional view as in a state before joining the ends of a strap together and FIG. 9 showing it in an enlarged transverse sectional view as in a state after joining.
Figure 9:
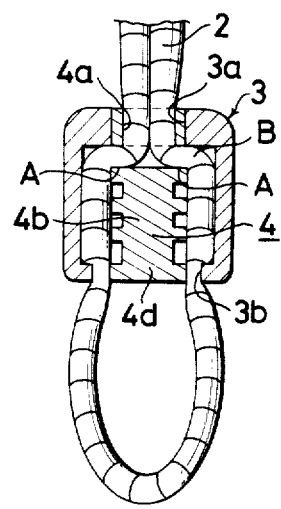

A second embodiment of this invention is arranged as shown in FIGS. 8 and 9. In this case, the core 4 of the first embodiment is modified while the arrangement of the rest of the embodiment and the advantageous effect attainable are the same as in the first embodiment described above.

The second embodiment features that the lid part 4b of the core 4 is arranged to have a width smaller than the opening 3b of the connector body 3, so that the strap 2 can be taken out. The arrangement is such that the joining point of the strap can be selected to permit adjustment of the length of the strap 2 between the base part of the core and the joining ends as desired.

Figure 10:
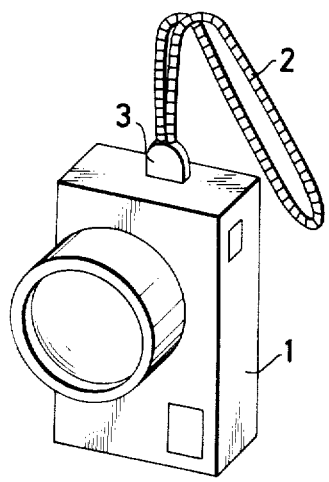
FIGS. 10 to 12 show a strap connector arranged as a third embodiment of this invention, FIG. 10 showing it in an oblique view as in a state of having the ends of a strap joined together on a camera, FIG. 11 showing it in an enlarged transverse sectional view as in a state before joining the ends of the strap together, and FIG. 12 showing it in an enlarged transverse sectional view as in a state after joining the ends of the strap together.
Figure 11:
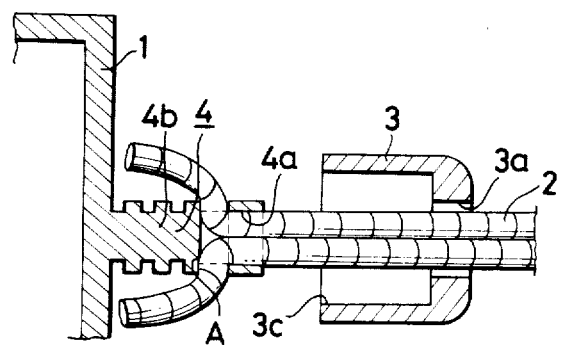
Figure 12:
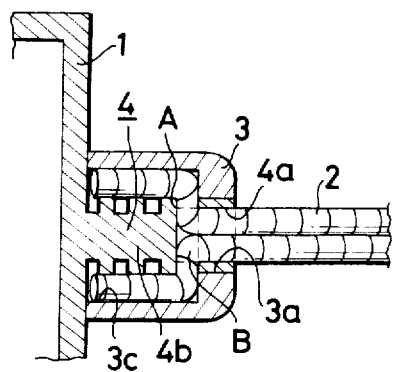

A third embodiment of this invention is arranged as shown if FIGS. 10, 11 and 12. In this embodiment, the core 4 of the first embodiment is formed, for example, in one unified body with a camera body 1. The arrangment of the rest of the third embodiment and the advantageous effect attainable thereby are identical with the first embodiment.

The third embodiment features that, with the core 4 formed in one body with the camera body 1 on one side thereof, for example, the ends of the strap 2 are joined together in that position by a snap fitting arrangement or the like. In this case, the opening 3c of the connector body 3 is formed in one side of the connector body 3 to have the same width as the width of the inside of the body 3. The arrangement of this embodiment is such that the eyelets 1a of the first embodiment can be omitted.

In accordance with this invention, as described in the foregoing, the strap connector which consists of the connector body and the core has the strap almost rectangularly bent within the strap connector; the edges of the core are arranged to bite into the strap to give a strong pinching force. Therefore, the joint of the strap will never be affected by an ordinary degree of impact thereon.

What is claimed is:

1. A strap connector assembly for a camera comprising:

an elongated strap member having a thickness dimension;

a connector body having a hollow interior with a pair of interior walls on opposite sides thereof and with openings at opposite ends thereof;

a core member adapted to be placed within said hollow interior of said connector body through one of said openings to grasp said strap member in clamped engagement therein, said core member being adapted to be removed from said interior of said connector body through said one opening to release said clamped engagement;

said core member being integrally formed to include a pair of opposed walls forming a gap therebetween with two parts of said strap member being held in juxtaposed position within said gap between said walls and a base part having one end spaced away from said opposed walls and extending therefrom to an end face thereof located on a side of said base part opposite said one end;

said strap member being held when in said clamped engagement with said two juxtaposed parts extending from one side of said gap through the other of said openings in said connector body and from an opposite side of said gap so as to be bent through two essentially 90° turns so as to extend to opposite sides of said base part to between said base part and said interior walls, respectively, of said connector body;

said one end of said base part being spaced away from said opposed walls defining said gap a distance at least equal to said thickness of said strap member and with a width at least equal to the width of said gap so as to engage said two parts of said strap member and divert said two parts through said two 90° turns and to opposite sides of said base part.

2. A strap connector according to claim 1 wherein said strap member is formed with a pair of ends terminating within said connector body between said interior walls and said base part on opposite sides thereof, respectively.

3. A strap connector according to claim 1, wherein said strap member is formed to extend outwardly of said connector member through said one opening with both said parts thereof located on opposite sides of said end face of said base part.

4. A strap connector according to claim 1, wherein said core member if formed integrally with said camera.

5. A strap connector according to claim 1, wherein with said core member placed within said connector body to establish said clamped engagement, said end face of said base part is arranged at said one opening of said connector body so as to form a closure member for said connector body.

6. A strap connector according to claim 1, wherein said base part of said core member if formed with a comb-like configuration including projections extending therefrom.

* * * * *

UNITED STATES PATENT AND TRADEMARK OFFICE
CERTIFICATE OF CORRECTION

PATENT NO. : 4,719,671

DATED : January 19, 1988

INVENTOR(S) : Hitomi Ito et al

It is certified that error appears in the above-identified patent and that said Letters Patent is hereby corrected as shown below:

On the Title Page:

In the heading of the Patent, it should read:

[73]  Assignee:  Canon Kabushiki Kaisha & Furuya Industries Co., Ltd.

Signed and Sealed this

Twenty-eighth Day of June, 1988

Attest:

DONALD J. QUIGG

Attesting Officer

Commissioner of Patents and Trademarks